Aug. 26, 1924.
L. ALEXANDER
CHILD'S VEHICLE
Filed June 16, 1923
1,506,726
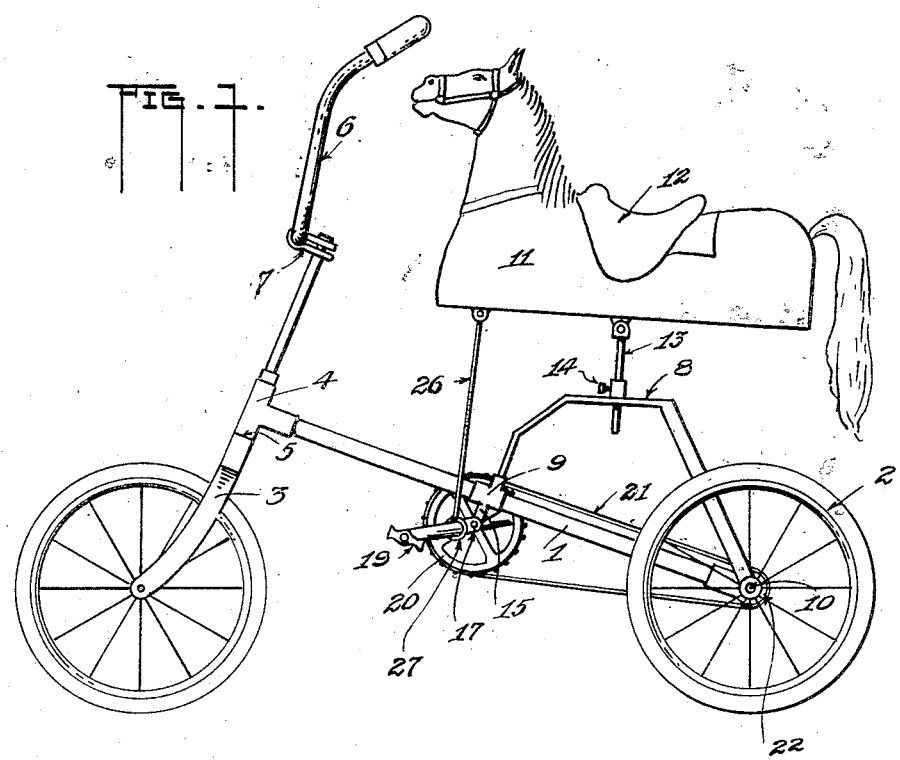
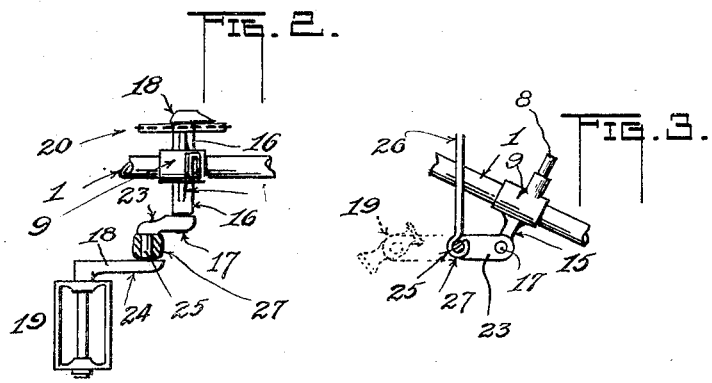
INVENTOR.
L. Alexander,
BY
ATTORNEY.

Patented Aug. 26, 1924.

1,506,726

UNITED STATES PATENT OFFICE.

LEWIS ALEXANDER, OF CLINTON, ILLINOIS, ASSIGNOR TO CLINTON NOVELTY CO., OF CLINTON, ILLINOIS, A COMMON LAW TRUST.

CHILD'S VEHICLE.

Application filed June 16, 1923. Serial No. 645,597.

*To all whom it may concern:*

Be it known that I, LEWIS ALEXANDER, a citizen of the United States, residing at Clinton, in the county of De Witt and State of Illinois, have invented new and useful Improvements in Children's Vehicles; and I do hereby declare that the following is a full, clear, and exact description of the invention, which will enable others skilled in the art to which it appertains to make and use the same.

This invention has reference to a child's velocipede or tricycle, pertaining more particularly to a tricycle having mounted thereon, for vertical rocking movement, the figure of a horse which forms the supporting seat for the rider.

The object of the invention is to so construct the device that the connections used to impart said vertical rocking movement to the horse from the driving mechanism will be applied in such manner as to utilize a minimum of power of the foot pedals and at points to operate said horse in the best and most direct way.

To the end that the invention may be fully understood, the accompanying drawing is presented forming part thereof.

Figure 1 is a side elevation of a tricycle showing my invention.

Figure 2 is a plan of a crank-shaft, part of the tricycle frame, and a cranked portion of said shaft to which a pitman is connected, shown in section, and Figure 3 is a side elevation of part of what is shown in said Figure 2, showing part in cross section.

The frame of the tricycle comprises for convenience and simplicity a straight tubular reach-section 1 having what may be termed its rear end supported in conventional manner between the rear wheels 2, but one of which is shown, the forward end being supported upon any usual forked standard 3 for steering purposes through a T-shaped tubular fitting 4 resting upon a shoulder 5 of said standard. The latter is provided with the customary handle-bar 6 adjustable for position through a clamp 7 as in common practice.

Erected upon the reach-section 1 is an angular frame 8 secured in fixed relation at its forward end in a fitting 9, its rear end being secured in suitable manner to the rear axle 10 in any approved manner not necessary to illustrate herein.

The rocking body of the represented horse is designated by the character 11 and has a suitable saddle 12 for the rider, said body being pivotally supported at the upper extremity of a vertically adjustable supporting standard 13 slidable through the frame 8 and secured by a set screw 14 for example.

Depending from the fitting 9 is a hanger-portion 15 including a tubular portion 16, Figure 2, within which is carried a shaft 17 provided at opposite ends with the usual crank-arms 18 terminating in the pedals 19.

A sprocket wheel 20 is secured to rotate with the shaft 17 and a drive-chain 21 is trained over the same and a pinion 22 affixed to the rear axle 10 or to one of the wheels in any desired manner.

My improved construction as applied to the vehicle will be understood from the following: One of the crank-arms 18, Figure 2, is made of two portions off-set from one another, as 23, 24, though a unitary structure, connected by a wrist-pin 25 whose axis parallels the said shaft 17.

A pitman is pivotally connected at one end to the body 11 in any convenient manner, Figure 1, and its other end terminates in a hook 27, Figures 1 and 3. Said pitman is preferably a malleable casting so that said hook 27 may be bent around the said wrist-pin 25 and said pitman is bent in its length so that its said hooked end and its end where pivoted to the body 11 may lie at different planes, or so that its last named end may lie in the plane of the reach 1 while the hooked end may lie well out of the way of the rider's leg.

The power is directly applied from the crank to tilt the body and the construction makes for simplicity and convenience of construction and incidentally results in low cost of production in that the pitman may be easily and quickly bent around the wrist-pin, the latter requiring little if any dressing even when the crank is a mere casting which method I prefer to employ for its manufacture.

I claim:

1. In a child's tricycle, including its wheeled frame, pivotally mounted seat-portion, and a driving mechanism including a crank-shaft and pedals, in combination, a wrist-pin included with one of the cranks of said crank-shaft, and a pitman pivotally connected at one end with the seat-portion, and at its other end connected to said wrist-pin for imparting vertical movement to said seat portion.

2. The combination with a child's vehicle including in its construction a wheeled frame, a seat-portion adapted for pivotal movement, and a driving mechanism including a shaft, a bearing on the frame therefor, and pedal-cranks, of a crank-pin formed with one of the cranks, and a pitman pivotally attached at one end to the seat-portion and terminating at its other end in a ductile extension adapted to be closed around said crank-pin forming a bearing about the same.

3. The combination with a child's vehicle including in its construction a wheeled frame, a seat portion adapted for pivotal movement, and a driving mechanism including a shaft, a bearing on the frame therefor, and pedal-cranks, of a crank-pin formed with one of said cranks between the pedal thereof and the said bearing, and a pitman pivotally connected at one end to the seat-portion and extending downwardly and outwardly from the latter to said crank-pin and enclosing the same.

4. The combination with a child's vehicle including in its construction a wheeled frame, a seat-portion adapted for pivotal movement, and a driving mechanism including a shaft, a bearing on the frame therefor, and pedal-cranks, of a crank-pin formed with one of the said cranks between the pedal thereof and the said bearing, and a pitman pivotally connected at one end to the seat-portion and extending downwardly and outwardly from the latter to said crank-pin adapted at its lower end to be bent around the latter forming a bearing upon the same.

5. The combination with a child's vehicle including a main frame, wheels upon which its rear end is supported, a wheel-mounted stem journaled in the forward end of said frame, a seat-portion pivotally supported on the frame, mechanism for driving the rear wheels including a cranked shaft journaled on the frame including pedals, a driving means operatively connecting said shaft and said rear wheels, of a crank-pin formed on one of the crank portions of the shaft, and a pitman pivotally attached at one end to the said seat-portion, its other end adapted to be bent into an eye engaging around said crank-pin forming a bearing connection for said pitman.

In testimony whereof I affix my signature in presence of two witnesses.

LEWIS ALEXANDER.

Witnesses:
 LEONARD W. INGHAM,
 DAVID T. GANO.